United States Patent
Best et al.

(10) Patent No.: US 6,980,020 B2
(45) Date of Patent: Dec. 27, 2005

(54) CALIBRATION METHODS AND CIRCUITS FOR OPTIMIZED ON-DIE TERMINATION

(75) Inventors: Scott C. Best, Palo Alto, CA (US); Anthony Koon Wong, Daly City, CA (US); David Leung, Cupertino, CA (US)

(73) Assignee: Rambus Inc., Los Altos, CA (US)

( * ) Notice: Subject to any disclaimer, the term of this patent is extended or adjusted under 35 U.S.C. 154(b) by 75 days.

(21) Appl. No.: 10/741,172

(22) Filed: Dec. 19, 2003

(65) Prior Publication Data

US 2005/0134303 A1    Jun. 23, 2005

(51) Int. Cl.[7] .................. H03K 19/003; H03K 17/16
(52) U.S. Cl. ..................... 326/30; 326/86; 327/108
(58) Field of Search .................... 326/30, 86, 83, 326/31, 34; 327/108, 109

(56) References Cited

U.S. PATENT DOCUMENTS

| | | | |
|---|---|---|---|
| 4,513,427 A | 4/1985 | Borriello et al. | |
| 5,254,883 A | 10/1993 | Horowitz et al. | 307/443 |
| 5,298,800 A | 3/1994 | Dunlop et al. | |
| 5,396,028 A | 3/1995 | Tomassetti | |
| 5,680,060 A | 10/1997 | Banniza et al. | |
| 5,926,031 A | 7/1999 | Wallace et al. | 326/30 |
| 5,969,658 A | 10/1999 | Naylor | 341/154 |
| 6,028,484 A | 2/2000 | Cole et al. | 330/295 |
| 6,064,224 A | 5/2000 | Esch, Jr. et al. | |
| 6,266,001 B1 | 7/2001 | Fang et al. | |
| 6,297,759 B1 | 10/2001 | Lewyn | 341/150 |
| 6,344,765 B2 | 2/2002 | Taguchi | |
| 6,411,122 B1 | 6/2002 | Mughal et al. | 326/30 |
| 6,418,500 B1 | 7/2002 | Gai et al. | 710/305 |
| 6,424,170 B1 | 7/2002 | Raman et al. | 326/30 |
| 6,462,591 B2 | 10/2002 | Garrett, Jr. et al. | 327/112 |
| 6,467,013 B1 | 10/2002 | Nizar | 711/1 |
| 6,525,558 B2 * | 2/2003 | Kim et al. | 326/30 |
| 6,530,062 B1 | 3/2003 | Liaw et al. | 716/2 |
| 6,545,522 B2 | 4/2003 | Mughal et al. | 327/334 |
| 6,573,746 B2 * | 6/2003 | Kim et al. | 326/30 |
| 6,573,747 B2 | 6/2003 | Radhakrishnan | 326/30 |
| 6,597,298 B2 | 7/2003 | Kim et al. | 341/111 |
| 6,606,004 B2 | 8/2003 | Staszewski et al. | 331/17 |
| 6,661,250 B2 * | 12/2003 | Kim et al. | 326/30 |
| 6,734,702 B1 | 5/2004 | Ikeoku et al. | |

(Continued)

OTHER PUBLICATIONS

Gabara, Thaddeus J. et al. "A 200 MHz 100K ECL Output Buffer for CMOS ASICs." 1990 IEEE. p. 4, no mo.

(Continued)

*Primary Examiner*—Daniel Chang
(74) *Attorney, Agent, or Firm*—Silicon Edge Law Group LLP; Arthur J. Behiel

(57) ABSTRACT

Described are on-die termination (ODT) systems and methods that facilitate high-speed communication between a transmitter die and a receiver die interconnected via one or more signal transmission lines. An ODT control system in accordance with one embodiment calibrates and maintains the termination resistances for the signal transmission lines. The ODT control system derives a number of calibration currents from precision voltage and resistance references and distributes the reference currents to a number of transmitters. Each transmitter then derives an ODT calibration signal using the respective reference current and another precision resistor, and then employs the calibration signal to calibrate local termination elements. Distributing calibrated currents provides excellent noise immunity, while limiting the requisite number of external voltage references reduces cost.

26 Claims, 4 Drawing Sheets

U.S. PATENT DOCUMENTS 6,762,620 B2    7/2004    Jang et al.
6,768,352 B1    7/2004    Maher et al.

OTHER PUBLICATIONS

Gabara, Thaddeus J., "On-Chip Terminating Resistors for High Speed ECL-CMOS Interfaces." Feb. 1992. IEEE. pp. 292-295.

Knight, Thomas F. Jr., "A Self-Terminating Low-Voltage Swing CMOS Output Driver." IEEE Journal of Solid-State Circuits, vol. 23, No. 2, Apr. 1988. pp. 457-464.

Gabara, Thaddeus J., "Digitally Adjustable Resistors in CMOS for High-Performance Applications." IEEE Journal of Solid-State Circuits, vol. 27, No. 8, Aug. 1992. pp. 1176-1185.

Babcock, J.A., "Precision Electrical Trimming of Very Low TCR Poly-SiGe Resistors." IEEE Electron Device Letters, vol. 21, No. 6, Jun. 2000. pp. 283-285.

Shah, Sunay et al., "A Temperature Independent Trimmable Current Source." Department of Engineering Science, University of Oxford. ISCAS 2002. 4 pages, no. mo.

Kim, Su-Chul, "Programmable Digital On-Chip Terminator." ITC-CSCC, 2002. 4 pages, no mo.

* cited by examiner

CALIBRATION METHODS AND CIRCUITS FOR OPTIMIZED ON-DIE TERMINATION

BACKGROUND

High-speed data communication integrated circuit (IC) dies are known to include both drivers and receivers. The drivers of one such IC connect to respective receivers on another via one or more signal transmission lines. ICs that include drivers and receivers also include termination elements that attempt to match the characteristic impedance of transmission lines to the output impedance of the associated driver and input impedance of the associated receiver. This matching is important, as impedance mismatches degrade signal quality and consequently reduce communication speed and reliability.

Some conventional communication systems employ control systems that calibrate the impedance of on-die termination (ODT) elements for improved impedance matching. For a detailed discussion of one such system, see U.S. Pat. No. 6,418,500 entitled "Feedback Control for Termination Adjustment," which issued on Jul. 9, 2002, to Gai et al. The system described by Gai et al. works well in many applications. Still, high-speed data communication circuits must achieve ever-greater performance levels, at competitive prices, to satisfy customer demand. There is therefore a need for area- and power-efficient ODT systems that facilitate improved data communication circuit performance.

SUMMARY

The present invention is directed to efficient on-die termination (ODT) systems and methods that facilitate high-speed communication between a driver die and a receiver die interconnected via one or more signal transmission lines. In accordance with one embodiment, complementary ODT control systems on respective driver and receiver dies calibrate and maintain the termination resistances on either side of the transmission lines to facilitate high-speed communication.

An ODT control system in one embodiment derives a number of reference currents from precision voltage and resistance references. The control system distributes the reference currents to transmitters or receivers that include termination elements in need of calibration. A calibration control circuit within each transmitter or receiver then derives an ODT calibration signal using the respective reference current and another precision resistor. The transmitter or receiver then employs the respective calibration signal to calibrate the local termination elements. Distributing calibrated currents is area efficient, provides excellent noise immunity, and limits the requisite number of expensive external voltage references.

This summary does not limit the invention, which is instead defined by the allowed claims.

DETAILED DESCRIPTION

Figure 1:
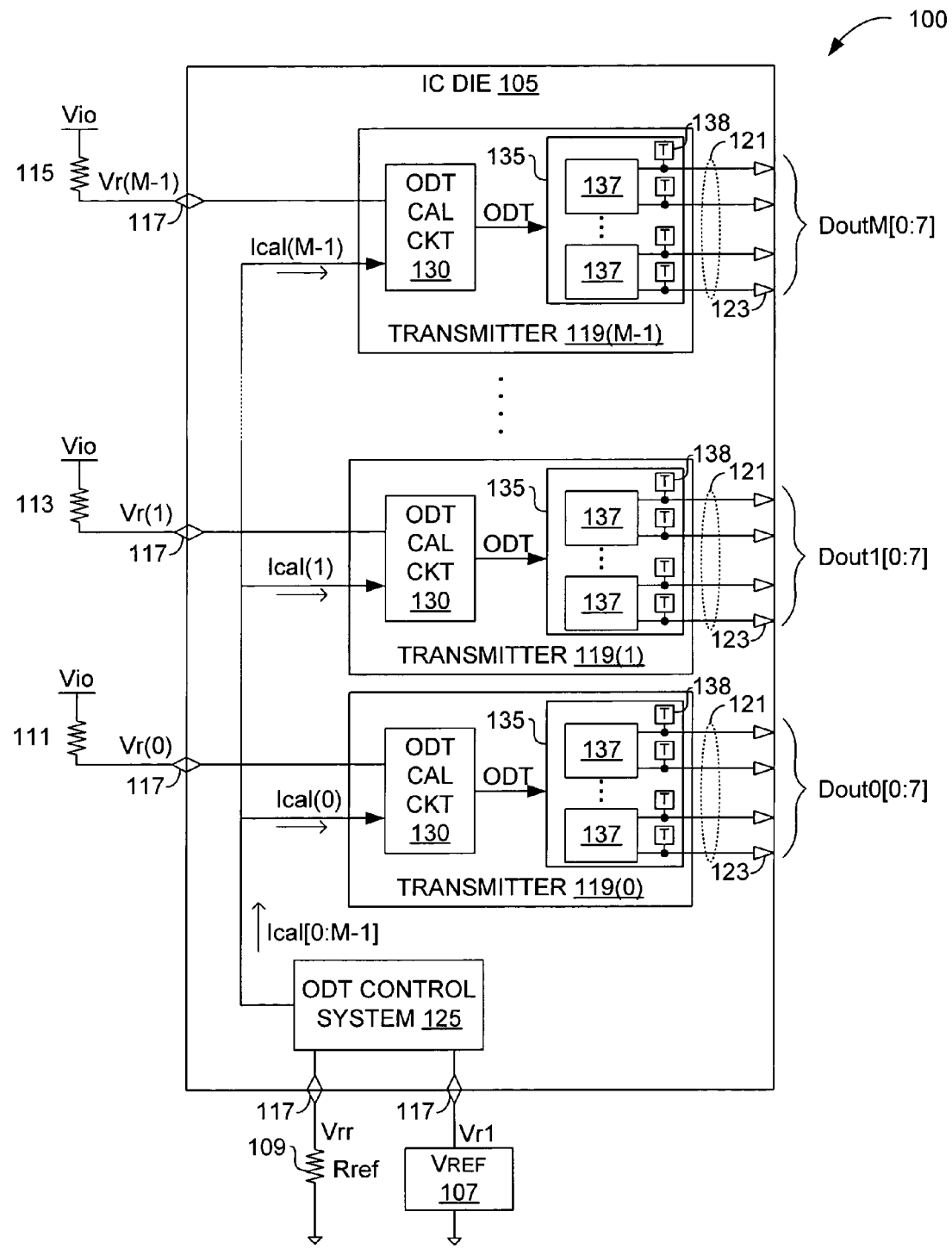
FIG. 1 depicts the transmit portion of a signal transmission system 100.

FIG. 1 depicts the transmit portion of a signal transmission system 100 in accordance with one embodiment. System 100 includes an integrated circuit (IC) die 105 and a number of precision reference components, including an external voltage reference 107 and a number of external resistors 109, 111, 113, and 115. Die 105 may be any of myriad types of processing chips capable of communicating electrical signals, with typical examples communicating via parallel or serial bus interfaces. The external components connect to die 105 via respective pads 117. IC die 105 additionally includes a number M of multi-channel communication circuits 119[0:M−1] driving M respective byte-wide data buses 121. In this example, a byte is eight bits, with each bit of buses 121 conveyed via a pair of differential signal-lines to corresponding output pads 123. As detailed below in connection with FIG. 4, pairs of pads 123 connect to corresponding pairs of signal lines in a respective differential communication channel. Die 105 includes an on-die termination (ODT) control system 125 that establishes and maintains the termination resistances of each transmitter 119[0:M−1].

ODT control system 125 delivers M respective calibration currents Ical[0:M−1] on like-named lines to each of transmitters 119[0:M−1]. (As with other designations herein, Ical[0:M−1] refers both to signals and their corresponding conductors; whether a given designation refers to a signal or a conductor will be clear from the context.) Transmitters 119[0:M−1] employ their respective calibration currents and external reference resistors to calibrate termination resistance levels for each communication channel. Transmitters 119[0:M−1] are identical, so the following descriptions is limited to transmitter 119(0) for brevity.

Transmitter 119(0) includes an ODT calibration circuit 130 and a driver collection 135 that includes N differential drivers 137, N being eight in this example. Each driver 137 includes two driver output terminals, each of which is coupled to a respective termination element 138. Calibration circuit 130 derives a termination control signal ODT using calibration current Ical(0) from control system 125 and a reference resistance exhibited by reference resistor 111. Calibration circuit 130 conveys termination control signal ODT to each termination element 138 within driver collection 135. Each termination element 138 responds to control signal ODT by maintaining the respective termination resistance relatively constant despite process, temperature, and supply-voltage fluctuations.

Control system 125 derives calibration currents Ical[0:M−1] from reference resistor 109 and the output voltage VR1 of voltage reference 107. Reference resistor 109 and voltage reference 107 exhibit precise, stable values, so calibration currents Ical[0:M−1] derived from these values are likewise precise and stable. Conventional current mirrors within control system 125 duplicate currents with excellent precision, so each calibration current Ical is substantially the same as the others. Equally important, distributed currents are, in contrast to distributed voltages, relatively immune to noise, so the individual calibration currents Ical[0:M−1] suffer very little degradation in route from control system 125 to the respective transmitter. Die 105 employs only one voltage reference 107 for ODT calibration, relying upon distributed calibration currents and external precision resistors to precisely calibrate each transmitter. Limiting the requisite number of external voltage references is important, as these circuits are relatively expensive. External resistors are, in contrast, relatively inexpensive.

Figure 2:
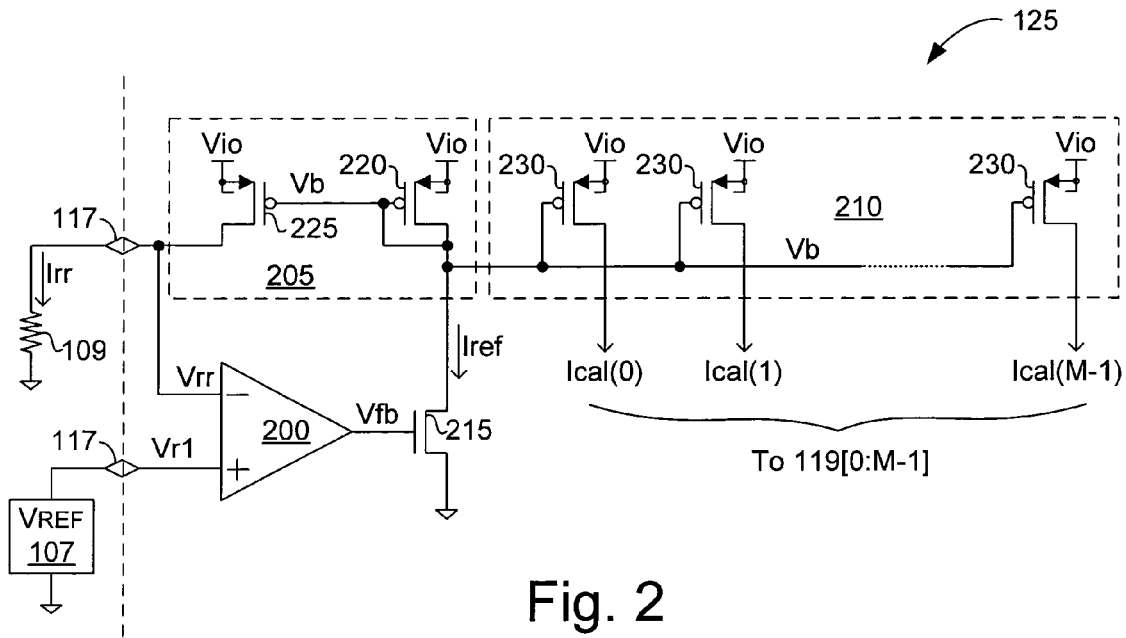
FIG. 2 depicts an embodiment of ODT control system 125 of FIG. 1.

FIG. 2 depicts ODT control system 125 of FIG. 1 in accordance with one embodiment. Control system 125 includes an operational amplifier 200 having a first amplifier input node connected to reference resistor 109 and a second amplifier input node connected to voltage reference 107. (A dashed line indicates the boundary between external components, on the left, and circuits integrated onto die 105, on the right.) Control system 125 additionally includes a feedback mirror 205, a multi-output current source 210, and a control transistor 215. Amplifier 200 generates a bias signal Vfb to the control gate of transistor 215, and consequently defines a reference current Iref. A diode-connected transistor 220 produces a bias voltage Vb from reference current Iref that controls the current through a feedback transistor 225 and each of a plurality of output transistors 230 within source 210. Current source 210 and transistor 220 together form a multi-output current mirror.

In the depicted embodiment, transistors 220, 225, and 230 are identical. Transistor 225 thus conducts a reference current Irr through reference resistor 109 that is identical to calibration current Ical[0:M−1] to respective transmitters 119[0:M−1]. Amplifier 200 adjusts feedback voltage Vfb, and consequently reference current Iref, so the voltage dropped across external resistor 109 matches the reference voltage Vr1 from precision external voltage reference 107. The resulting reference current Iref is therefore relatively independent of process, temperature, and supply-voltage. Current source 210 employs identical transistors 230 to produce the M calibration currents Ical[0:M−1] for distribution to transmitters 119[0:M−1]. Calibration currents Ical[0:M−1] are therefore calibrated based on a precision external voltage reference 107 and resistor 109.

In one embodiment, the first reference voltage Vr1 and input/output voltage Vio are each 1.8 volts, each of the external resistors is 50 ohms, reference voltage Vref is 350 millivolts, and reference current Irr is 7 milliamps. However, these values are illustrative and not limiting. In other embodiments, the value of reference resistor 109 is set to some multiple of the desired termination impedance. Thus, for example, if the target termination value is 50 ohms, reference resistance Rref might be 500 ohms, reducing reference current Irr from 7 milliamps to 0.7 milliamps. Calibration currents Ical[0:M−1] can be similarly scaled by selecting appropriate width ratios between transistor 220 and transistors 230.

In the embodiments of FIGS. 1 and 2, control system 125 distributes calibration currents to each transmitter. In other embodiments, one or more transmitters can incorporate current mirrors that duplicate a received calibration current and convey the duplicated calibration current to another transmitter. The depicted embodiment is preferred, however, as each mirroring of current can be expected to introduce a small degree of error.

Another embodiment replaces external reference resistor 109 and voltage reference 107 with an external reference current, saving one pad 117. Control system 125 is then modified to eliminate transistor 225, amplifier 200, and transistor 215. Instead, the pad connected to the external reference current connects to the drain of transistor 220, drawing current Iref. Current mirror 210 then duplicates and distributes the reference current.

Figure 3:
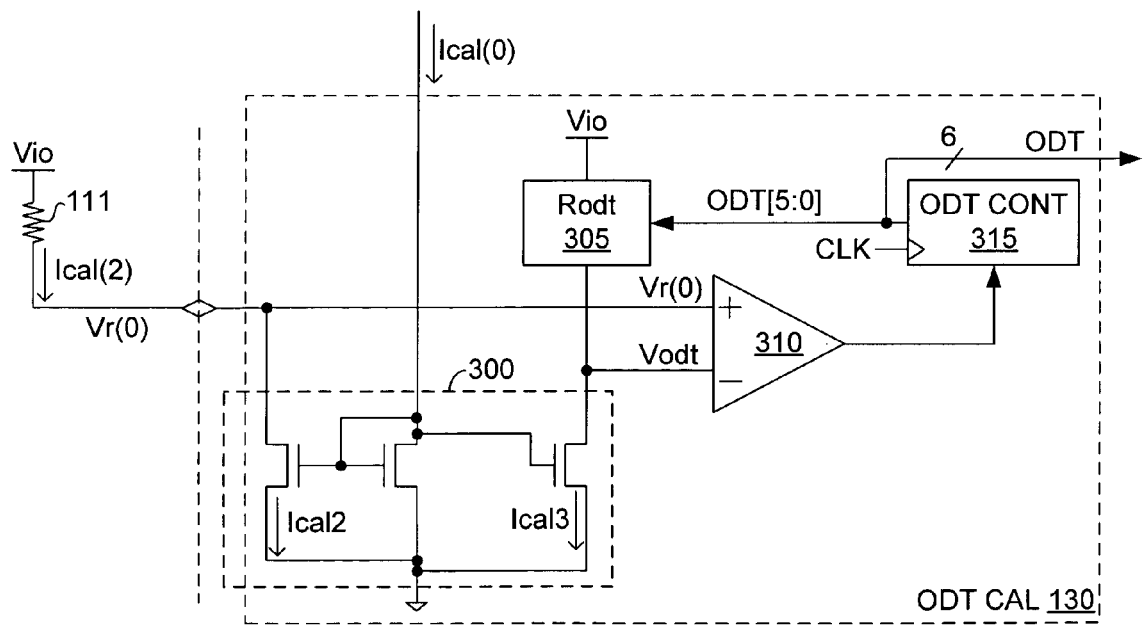
FIG. 3 depicts an embodiment of ODT calibration circuit 130 of FIG. 1.

FIG. 3 depicts ODT calibration circuit 130 of FIG. 1 in accordance with one embodiment. This example explains the operation of calibration circuit 130 within transmitter 119(0), with the remaining multi-channel transmitters 119 [2:M−1] operating identically.

Calibration circuit 130 includes a dual-output current mirror 300, a reference ODT resistor 305, a comparator 310, and an ODT counter 315. Current mirror 300 mirrors calibration current Ical(0) from control system 125 (FIG. 1) to produce a second calibration current Ical2 through local external reference resistor 111 and a third calibration current Ical3 through ODT reference resistor 305. Comparator 310 then compares the voltages dropped across reference resistor 111 and reference ODT resistor 305. Counter 315 then increments or decrements upon receipt of a clock CLK to either increase or decrease the resistance exhibited by reference ODT resistor 305 as necessary to equalize voltage Vr(0) from external resistor 111 and voltage Vodt from ODT resistor 305.

The opposite node of each resistor 111 and 305 connects to the same input/output voltage Vio, and currents Ical2 and Ical3 are equal, so setting voltages Vr(0) and Vodt equal sets the resistance Rodt exhibited by ODT resistor 305 equal to the resistance of external reference resistor 111. Counter 315 thus stores a digital value representative of the offset required to calibrate ODT resistor 305 equal to external resistor 111. The digital value from counter 315 is then conveyed throughout transmitter 119(0) (FIG. 1) to calibrate termination elements 138. Resistor 305 is a replica of ODT resistors 138, but may be of a different size or value. Resistor 305 is formed using the same process sequence as resistors 138, and so varies in the same manner with process, voltage, and temperature.

The granularity of the count provided by counter 315 introduces some uncertainty as to the exact termination resistance. Employing more register bits and associated bus lines for calibration signal ODT reduces this uncertainty at the expense of increased overhead.

Like resistor 109, resistor 111 can be scaled up or down, as can calibration currents Ical2 and Ical3. Assume, for example, a system with the following parameters: (1) Rodt=50 ohms; (2) Iodt=7 milliamps; (3) calibration current Ical(0)=0.7 milliamps; and reference resistor 111=200 ohms. In that case, current mirror 300 can be modified so that Ical3 is ten times Ical(0), or 7 milliamps, and Ical2 is 50/200 times Ical(0), or 1.75 milliamps. Thus, as used herein, the term "current mirror" refers to circuits that produce one or more output currents that are proportional to an input current, the input and output currents not necessarily having a one-to-one relationship. Many other permutations are possible, as will be understood by those of skill in the art.

Figure 4:
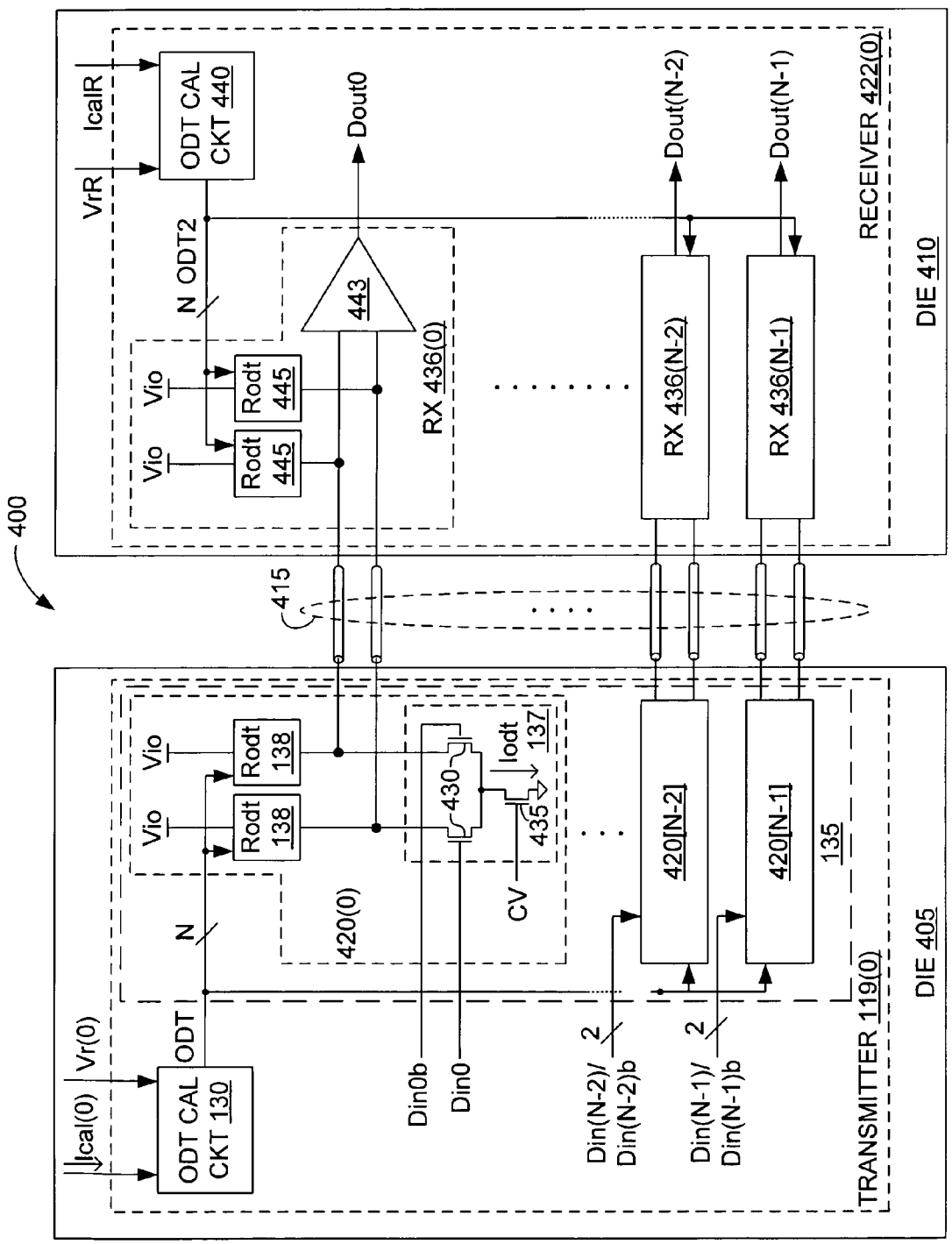
FIG. 4 depicts a signal transmission system 400 in accordance with another embodiment.

FIG. 4 depicts a signal transmission system 400 in accordance with another embodiment. System 400 includes first and second IC dies 405 and 410 interconnected via a multi-channel communication bus 415. Die 405 includes a transmitter 119(0) similar to the like-identified element of die 105 in FIG. 1. Die 405 is otherwise similar to die 105, with like-numbered elements being the same or similar, but omits some components of FIG. 1 for brevity.

Die 410 includes M multi-channel communication circuits connected to respective multi-channel transmitters 119[0:M−1] via respective buses 415, though only one multi-channel communication circuit, multi-channel receiver 422(0), is shown. Also included in die 410 but omitted here are an ODT control system similar to system 125 of FIG. 1 and used to derive a calibration current IcalR, the requisite external voltage reference 107 and reference resistor 109 for system 125, and an additional reference resistor for developing a reference voltage VrR for receiver 422(0). These elements operate as described in connection with FIGS. 1 through 3, and are consequently omitted here.

Returning to die 405, transmitter 119(0) includes N identical drivers 420[0:N−1], only one of which, driver 420(0), is detailed. Driver circuit 420(0) includes a pair of termination elements 138 (ODT resistors) connected between input/output voltage terminal Vio and respective ones of a pair of signal transmission lines in bus 415. Driver 420(0) additionally includes current-controlled driver 137, which in turn includes a pair of input transistors 430 and a current-source transistor 435. Each of transistors 430 connects between one of termination elements 138 and a power-supply terminal GND via transistor 435. A control voltage CV on the gate of transistor 435 establishes an ODT current Iodt, and consequently controls the maximum voltage drop across termination elements 138. One embodiment takes control voltage CV from the gates of the transistors in current mirror 300 (FIG. 3).

ODT calibration circuit 130 derives calibration signal ODT in the manner described above in connection with FIGS. 2 and 3. Termination elements 138 are fabricated to be identical, or nearly so, to reference ODT resistor 305 of FIG. 2, and so respond in kind to calibration signal ODT. In short, calibration circuit 130 calibrates reference termination resistor 305 (FIG. 3) by establishing an appropriate calibration signal ODT, and this calibration signal is then distributed to identical termination resistors 138 on the same die to establish and maintain the correct termination resistances.

FIG. 4 details receiver circuit 436(0), one of N receiver circuits 436[0:N−1]. Receiver circuit 436(0) includes an input sampler 443, with differential input terminals, and a pair of termination elements 445. Termination elements 445 are calibrated in the same manner as termination elements 138 via an ODT control signal ODT2 from an ODT calibration circuit 440 on die 410.

In the depicted example, transmitter 119(0) transmits N differential signal pairs Din[0:N−1]/Din[0:N−1]b as small-swing differential signals to corresponding multi-channel receiver 422(0). Bus 415 is bidirectional in other embodiments. Further, while system 400 includes two pairs of termination elements per differential channel, other embodiments include one pair of shared ODT elements per channel.

System 400 is an example in which two dies communicate signals via external lines, or "channels," but other embodiments optimize termination characteristics to improve communication speed between circuits occupying the same die. Channel 415 may include, for example, wires, cables, printed-circuit traces, chip etchings, waveguides, or other media that allow for transmission of signals. Also, unless otherwise defined, terminals, lines, conductors, and traces that carry a given signal fall under the umbrella term "node"; in general, the choice of a given description of a circuit node is a matter of style, and is not limiting. The "termination characteristic" addressed herein is resistance, but other characteristics such as drive current and signal swing might also be calibrated.

Figure 5:
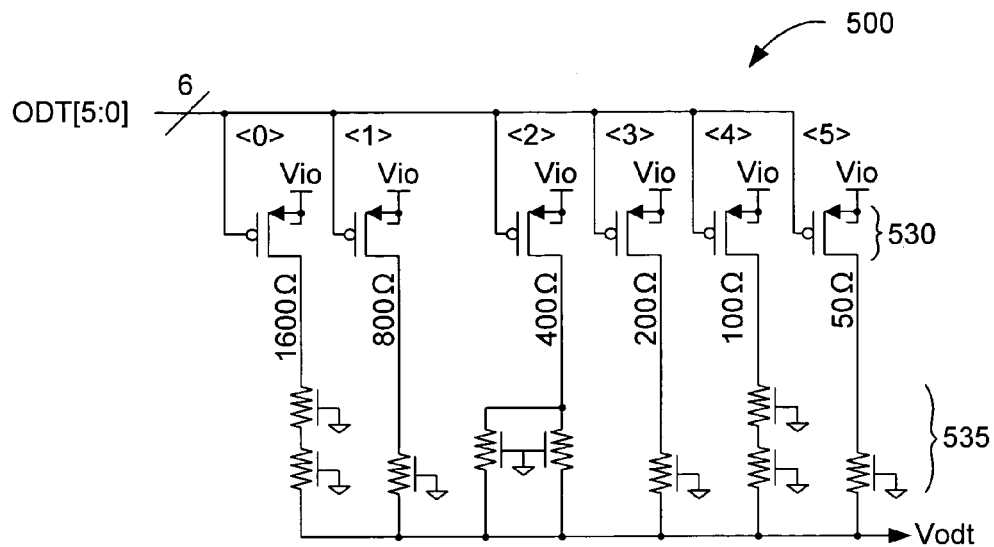
FIG. 5 depicts an ODT termination element 500 in accordance with one embodiment.

FIG. 5 depicts an ODT termination element 500 in accordance with one embodiment. Termination element 500 can be used in place of ODT resistor 305 of FIG. 3 and in place of termination elements 138 and 445 of FIG. 4. Termination element 500 includes a resistor network 535 and a collection of PMOS transistors 530, the gates of which are connected to the six lines of control bus ODT[5:0] of FIG. 3 (ODT[5:0] is alternatively referred to herein as ODT). Each PMOS transistor 530 controls the current through a respective resistive path. These resistive paths provide binary-weighted resistances from about 50 to 1600 ohms, so termination element 500 can produce a wide range of resistances by enabling selected transistors 530. (These weighted resistance values can very widely with process, temperature, and voltage variations, hence the need for ODT calibration.)

Transistors 530 are relatively small to reduce the effect of capacitance on transmission lines 415, and so are responsible for a significant percentage of the resistance through element 500 (e.g., as much as about 30% in one embodiment). The I-V characteristics of transistors 530 are somewhat non-linear, and this non-linearity produces some non-linearity in the resistance through element 500. As a consequence, the resistance through element 500 varies with current. The calibration current used to calibrate ODT resistor 305 is therefore set close to the operating currents of termination elements 138 so the resistance of termination elements 138 and 445 closely matches the corresponding external precision resistance during operation.

The binary-weighted scheme of element 500 provides a relatively low-capacitance, area-efficient means of producing a large number of potential resistance values, but can introduce problematic glitches when switching between values. For example, incrementing the six low-order bits ODT[5:0] from 011111 to 10000 to vary the selected resistance from about 50 ohms to about 52 ohms turns off the right-most one of transistors 530 and turns on the remaining transistors 530. Imperfect timing can momentarily introduce intermediate resistance values significantly over or under the desired 52 ohms. Such a resistive glitch can cause transmission errors in systems that dynamically monitor and adjust termination values to compensate for supply-voltage and temperature variations.

Figure 6:
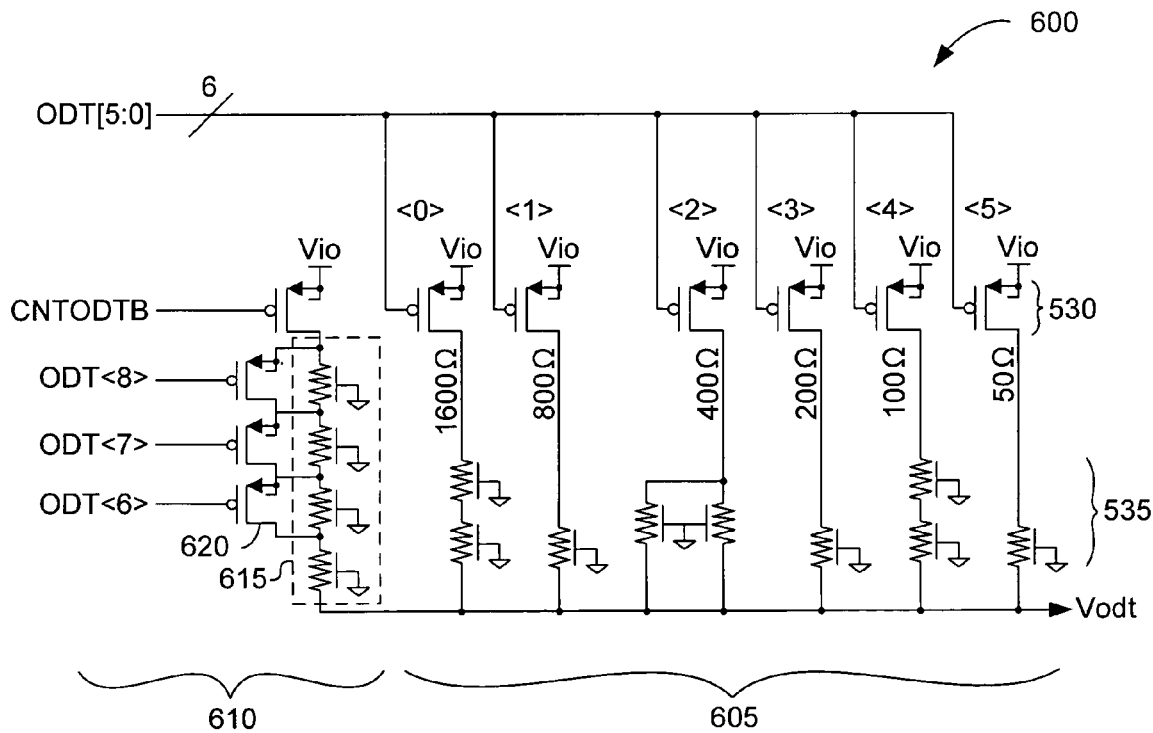
FIG. 6 depicts a termination element 600 in accordance with an embodiment that addresses the glitch problem associated with termination element 500.

FIG. 6 depicts a termination element 600 in accordance with an embodiment that addresses the glitch problem associated with termination element 500. Termination element 600 is divided into two portions 605 and 610. Portion 605, identical to termination element 500 of FIG. 5, provides a broad range of resistance values in an area-efficient configuration. Portion 610 facilitates fine resistance adjustments by incrementally connecting a series of transistors 620 in parallel with resistive elements in a voltage divider 615. Thermometer coding means that transistors 620 are enabled one at a time, in series. The possible combinations of signals on three additional control lines ODT[8:6] are 000 (lowest resistance), 100, 110, and 111 (highest resistance). Other schemes are possible, and more or fewer series resistors can be included. Transistors 620 are arranged in series to minimize the effects of capacitance.

Portion 605 is calibrated in the manner described above and the control bits provided on bus ODT[5:0] held steady during operation. Portion 610 can likewise be held steady, or can be modified continuously or periodically to compensate for supply-voltage or temperature fluctuations. Like control bits ODT[5:0], control bits ODT[8:6] can be derived by a common calibration circuit and distributed to a number of termination elements; alternatively, control bits ODT[8:6] can be derived separately for each signal pad or pair of signal pads. An ODT-control signal CNTODTb can be deasserted to disable portion 610, while calibrating portion 605, for example. Embodiments that employ termination element 600 replace counter 315 of FIG. 3 with control circuitry that generates the required control signals for termination element 600, as will be readily apparent to those of skill in the art.

While the present invention has been described in connection with specific embodiments, variations of these embodiments will be obvious to those of ordinary skill in the art. For example, (1) the external voltage and resistance references may be substituted in other embodiments with on-chip references; (2) the ODT circuits can be constructed entirely of PMOS transistors, as PMOS transistors behave like a resistor when operating in the linear region (e.g., with the gate connected to ground); (3) the thermometer portion 610 (FIG. 6) can have multiple "legs" connected in parallel; and (4) one or more of the transistors 620 within thermometer portion 610 can be replaced with a single transistor controlled by a digital-to-analog converter. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. section 112.

What is claimed is:

1. An integrated circuit die comprising:
   a. a current source having a plurality of calibration-current output nodes providing a corresponding plurality of calibration currents;
   b. a plurality of multi-channel communication circuits, each communication circuit including:
      i. a first calibration-circuit input node coupled to a respective one of the calibration-current output nodes and receiving one of the calibration currents;
      ii. a second calibration-circuit input node coupled to a reference resistor;
      iii. a calibration-circuit output port providing a termination-control signal; and
      iv. a plurality of termination elements, each termination element exhibiting a termination characteristic and including a termination control port coupled to the calibration-circuit output port and receiving the termination-control signal;
   c. a plurality of pads, each pad coupled to a corresponding one of the termination elements and adapted to convey signals between the die and a communication channel; and
   d. wherein the communication channel comprises a signal-line pair.

2. The integrated circuit die of claim 1, wherein the termination characteristic comprises termination resistance.

3. The integrated circuit die of claim 1, further comprising a control system deriving a reference current from a reference voltage and a reference resistance, wherein the current source derives the calibration currents from the reference current.

4. The integrated circuit die of claim 1, further comprising a plurality of differential signal-line pairs, each signal-line pair including a first signal line coupled to a first of the termination elements and a second signal line coupled to a second of the termination elements.

5. The integrated circuit die of claim 1, further comprising a plurality of pads, each pad coupled to a corresponding one of the termination elements and adapted to convey signals between the die and a communication channel.

6. An integrated circuit die comprising:
   a. a current source having a plurality of calibration-current output nodes providing a corresponding plurality of calibration currents;
   b. a plurality of multi-channel communication circuits, each communication circuit including:
      i. a first calibration-circuit input node coupled to a respective one of the calibration-current output nodes and receiving one of the calibration currents;
      ii. a second calibration-circuit input node coupled to a reference resistor;
      iii. a calibration-circuit output port providing a termination-control signal; and
      iv. a plurality of termination elements, each termination element exhibiting a termination characteristic and including a termination control port coupled to the calibration-circuit output port and receiving the termination-control signal;
   c. wherein the communication circuit comprises a multi-channel transmitter.

7. An integrated circuit die comprising:
   a. a current source having a plurality of calibration-current output nodes providing a corresponding plurality of calibration currents;
   b. a plurality of multi-channel communication circuits, each communication circuit including:
      i. a first calibration-circuit input node coupled to a respective one of the calibration-current output nodes and receiving one of the calibration currents;
      ii. a second calibration-circuit input node coupled to a reference resistor;
      iii. a calibration-circuit output port providing a termination-control signal; and
      iv. a plurality of termination elements, each termination element exhibiting a termination characteristic and including a termination control port coupled to the calibration-circuit output port and receiving the termination-control signal;
   c. wherein the communication circuit comprises a multi-channel receiver.

8. A termination circuit for a first plurality of multi-channel communication circuits on an integrated circuit die, each communication circuit selected from a group consisting of multi-channel transmitters and multi-channel receivers and adapted to communicate with a corresponding second plurality of multi-channel communication circuits selected from the group, the termination circuit comprising:
   a. a first reference resistor external to the die and exhibiting a first reference resistance;
   b. a reference-voltage generator external to the die and providing a reference voltage on a reference-voltage node; and
   c. a reference-current generator integrated onto the die and including:
      i. a first input node coupled to the first reference resistor;
      ii. a second input node coupled to the reference-voltage node; and
      iii. a plurality of reference-current output nodes providing a corresponding plurality of calibration currents;
      iv. wherein the reference-current generator generates each of the plurality of calibration currents; and
      v. wherein each of the calibration currents is a function of the first reference resistance and the reference voltage;

d. for each of the first plurality of multi-channel communication circuits:
  i. a local reference resistor external to the die and exhibiting a second reference resistance;
  ii. a local on-die-termination (ODT) calibration circuit having a first calibration-circuit input node coupled to one of the reference-current output nodes and receiving the corresponding one of the plurality of calibration currents, a second calibration-circuit input node coupled to the local reference resistor, and a calibration-circuit output port providing a termination-control signal; and
  iii. a plurality of termination elements coupled to the calibration-circuit output port.

9. The termination circuit of claim 8, wherein each of the multi-channel communication circuits includes a plurality of driver output nodes, each of the driver output nodes exhibiting a termination characteristic.

10. The termination circuit of claim 8, wherein the reference-current generator further includes an amplifier having first and second complementary input terminals coupled to the first and second input nodes, respectively.

11. A termination circuit for an integrated circuit die, the termination circuit comprising:
  a. a first reference resistor external to the die and exhibiting a first reference resistance;
  b. a reference-voltage generator external to the die and providing a reference voltage on a reference-voltage node; and
  c. a reference-current generator integrated onto the die and including:
    i. a first input node coupled to the first reference resistor;
    ii. a second input node coupled to the reference-voltage node; and
    iii. a plurality of reference-current output nodes providing a corresponding plurality of calibration currents;
    iv. wherein the reference-current generator generates each of the plurality of calibration currents; and
    v. wherein each of the calibration currents is a function of the first reference resistance and the reference voltage;
  d. a plurality of multi-channel communication circuits, each communication circuit including:
    i. a local reference resistor external to the die and exhibiting a second reference resistance; and
    ii. a local calibration circuit having a first calibration-circuit input node coupled to one of the reference-current output nodes and receiving the corresponding one of the plurality of calibration currents, a second calibration-circuit input node coupled to the local reference resistor, and a calibration-circuit output port providing a termination-control signal;
    iii. wherein each of the multi-channel communication circuits includes a plurality of driver output nodes, each of the driver output nodes exhibiting a termination characteristic; and
  e. for each driver output node, a termination element coupled between the driver output node and a second reference voltage.

12. The termination circuit of claim 11, wherein each termination element includes a termination control port coupled to the calibration circuit output port and receiving the termination control signal.

13. The termination circuit of claim 12, wherein each termination element exhibits a termination resistance that varies with changes in the termination control signal.

14. The termination circuit of claim 13, wherein the calibration circuit adjusts the termination control signal to maintain equivalence between the second reference resistance and the termination resistance.

15. The termination circuit of claim 11, wherein the second reference voltage is substantially equal to the first-mentioned reference voltage.

16. A termination circuit for an integrated circuit die, the termination circuit comprising:
  a. a first reference resistor external to the die and exhibiting a first reference resistance;
  b. a reference-voltage generator external to the die and providing a reference voltage on a reference-voltage node; and
  c. a reference-current generator integrated onto the die and including:
    i. a first input node coupled to the first reference resistor;
    ii. a second input node coupled to the reference-voltage node; and
    iii. a plurality of reference-current output nodes providing a corresponding plurality of calibration currents;
    iv. wherein the reference-current generator generates each of the plurality of calibration currents;
    v. wherein each of the calibration currents is a function of the first reference resistance and the reference voltage; and
    vi. wherein the reference-current generator further includes an amplifier having first and second complementary input terminals coupled to the first and second input nodes, respectively;
  d. a plurality of multi-channel communication circuits, each communication circuit including:
    i. a local reference resistor external to the die and exhibiting a second reference resistance; and
    ii. a local calibration circuit having a first calibration-circuit input node coupled to one of the reference-current output nodes and receiving the corresponding one of the plurality of calibration currents, a second calibration-circuit input node coupled to the local reference resistor, and a calibration-circuit output port providing a termination-control signal;
  e. wherein the reference-current generator further includes a current mirror having a reference leg coupled to an output of the amplifier and a plurality of current-mirror legs coupled to each of the plurality of reference-current output nodes and providing the corresponding plurality of calibration currents.

17. The termination circuit of claim 16, wherein the plurality of calibration currents are substantially equal.

18. A termination circuit for an integrated circuit die, the termination circuit comprising:
  a. a first reference resistor external to the die and exhibiting a first reference resistance;
  b. a reference-voltage generator external to the die and providing a reference voltage on a reference-voltage node; and
  c. a reference-current generator integrated onto the die and including:
    i. a first input node coupled to the first reference resistor;
    ii. a second input node coupled to the reference-voltage node; and iii. a plurality of reference-current output nodes providing a corresponding plurality of calibration currents;
iv. wherein the reference-current generator generates each of the plurality of calibration currents; and
v. wherein each of the calibration currents is a function of the first reference resistance and the reference voltage;
d. a plurality of multi-channel communication circuits, each communication circuit including:
i. a local reference resistor external to the die and exhibiting a second reference resistance; and
ii. a local calibration circuit having a first calibration-circuit input node coupled to one of the reference-current output nodes and receiving the corresponding one of the plurality of calibration currents, a second calibration-circuit input node coupled to the local reference resistor, and a calibration-circuit output port providing a termination-control signal;
iii. wherein the local calibration circuit further comprises:
a reference termination resistor having first and second resistor terminals and a reference-termination-resistor control port;
a comparator having a first comparator input terminal coupled to the local reference resistor, a second comparator input terminal coupled to the second resistor terminal, and a comparator output terminal;
a feedback circuit coupled between the comparator output terminal and the termination-resistor control port; and
a current mirror receiving the calibration current and producing a second calibration current passing through the local reference resistor and a third calibration current passing through the reference termination resistor.

19. A method of calibrating a plurality of termination elements on an integrated-circuit die, wherein the termination elements are portions of communications circuits on the die, the method comprising:
a. providing a first calibration current to each of the communication circuits;
b. for each communication circuit:
i. mirroring the received first calibration current to produce a second calibration current proportional to the first calibration current;
ii. mirroring at least one of the first and second calibration currents to produce a third calibration current proportional to the first calibration current;
iii. drawing the second calibration current through a reference resistor external to the die to develop a first reference voltage;
iv. drawing the third calibration current through an adjustable reference on-die-termination (ODT) resistor on the die to develop an ODT voltage;
v. comparing the first reference voltage to the ODT voltage; and
vi. adjusting the plurality of termination elements in response to the comparing.

20. The method of claim 19, further comprising connecting an external voltage reference to the die, connecting an external reference resistor to the die, and deriving the first calibration currents using the voltage reference and the external reference resistor.

21. The method of claim 19, further comprising adjusting the adjustable reference ODT resistor in response to the comparing.

22. The method of claim 21, wherein adjusting the reference ODT resistor and the plurality of termination elements comprises conveying a termination control signal to the reference ODT resistor and termination elements.

23. The method of claim 19, wherein the communication circuits include at least one driver.

24. A signal communication system comprising:
a. a plurality of communication circuits, each communication circuit selected from a group consisting of transmitters and receivers, each communication circuit including at least one termination resistor and a local reference resistor exhibiting a local reference resistance; and
b. a termination calibration system comprising: means for deriving a plurality of calibration currents;
means for distributing each of the plurality of calibration currents to the local reference resistance in each of the respective ones of the communication circuits; and
means for calibrating the at least one termination resistor in each of the plurality of communication circuits using the respective calibration current.

25. The signal communication system of claim 24, wherein the means for calibrating the at least one termination resistor in each of the plurality of communication circuits includes a current mirror receiving the respective calibration current.

26. A signal communication system comprising:
a. a plurality of communication circuits, each communication circuit including at least one termination resistor and a local reference resistor exhibiting a local reference resistance;
b. a termination calibration system comprising:
i. means for distributing each of a plurality of calibration currents to respective ones of the communication circuits; and
ii. means for calibrating the at least one termination resistor in each of the plurality of communication circuits using the respective calibration current.
c. wherein the means for calibrating the at least one termination resistor in each of the plurality of communication circuits includes a current mirror receiving the respective calibration current; and
d. wherein the current mirror includes a reference termination resistor, and wherein the current mirror derives from the respective calibration current a third calibration current through the reference termination resistor.

* * * * *